US008804484B2

(12) United States Patent
Blanconi et al.

(10) Patent No.: US 8,804,484 B2
(45) Date of Patent: Aug. 12, 2014

(54) METHODS, SYSTEMS, AND COMPUTER READABLE MEDIA FOR AUTOMATIC, PEER NODE TRANSPARENT REHOMING OF TIME DIVISION MULTIPLEXED (TDM)-BASED SIGNALING CHANNELS IN AN X USER ADAPTATION (XUA) SIGNALING GATEWAY

(75) Inventors: Richard James Blanconi, Rowlett, TX (US); Jilin Huang, Coppell, TX (US)

(73) Assignee: Genband US LLC, Frisco, TX (US)

( * ) Notice: Subject to any disclaimer, the term of this patent is extended or adjusted under 35 U.S.C. 154(b) by 623 days.

(21) Appl. No.: 13/026,967

(22) Filed: Feb. 14, 2011

(65) Prior Publication Data

US 2011/0280119 A1 Nov. 17, 2011

Related U.S. Application Data

(60) Provisional application No. 61/345,062, filed on May 14, 2010.

(51) Int. Cl.
*H04L 1/00* (2006.01)

(52) U.S. Cl.
USPC .......................................... 370/216; 370/217

(58) Field of Classification Search
USPC ................................................ 370/216, 217
See application file for complete search history.

(56) References Cited

U.S. PATENT DOCUMENTS

| | | | | |
|---|---|---|---|---|
| 4,833,708 A | * | 5/1989 | Goodrich | 379/327 |
| 7,599,285 B2 | * | 10/2009 | Zhou et al. | 370/217 |
| 2006/0098628 A1 | * | 5/2006 | Bouckaert et al. | 370/352 |
| 2006/0245350 A1 | * | 11/2006 | Shei et al. | 370/216 |
| 2006/0288114 A1 | * | 12/2006 | Lu et al. | 709/231 |
| 2007/0076727 A1 | * | 4/2007 | Shei | 370/401 |
| 2007/0185849 A1 | * | 8/2007 | Vinnakota et al. | 707/3 |
| 2007/0191035 A1 | * | 8/2007 | Huggett | 455/466 |
| 2008/0002669 A1 | * | 1/2008 | O'Brien et al. | 370/352 |
| 2011/0085441 A1 | * | 4/2011 | Poonawalla et al. | 370/228 |

OTHER PUBLICATIONS

Morneault et al., "Integrated Services Digital Network (ISDN) Q.921-User Adaptation Layer," Network Working Group, RFC 4233 (Jan. 2006).

* cited by examiner

*Primary Examiner* — Farah Faroul
(74) *Attorney, Agent, or Firm* — Fogarty, L.L.C.

(57) ABSTRACT

The subject matter described herein includes methods, systems and computer readable media for automatic, peer node transparent re-homing of time division multiplexed (TDM)-based signaling channels in an X user adaptation (XUA) signaling gateway. One exemplary method includes providing an XUA Signaling Gateway (SG) having a plurality of Signaling Gateway (SG) cards, a plurality of TDM network interface cards (NICs) and a plurality of packet NICs, and a switching matrix connecting the TDM NICs and the XUA SG cards. The method further includes configuring the switching matrix so that a first XUA SG card terminates a set of TDM-based signaling channels. The method further includes switching the set of TDM-based signaling channels from one of the TDM NICs to the first XUA SG card. The method further includes switching the set of TOM-based signaling channels, detecting failure of the first XUA SG card, and automatically reconfiguring the TDM switching matrix so that the set of TDM-based signaling channels is sent to a second XUA SG card of the plurality of XUA SG cards.

25 Claims, 6 Drawing Sheets

METHODS, SYSTEMS, AND COMPUTER READABLE MEDIA FOR AUTOMATIC, PEER NODE TRANSPARENT REHOMING OF TIME DIVISION MULTIPLEXED (TDM)-BASED SIGNALING CHANNELS IN AN X USER ADAPTATION (XUA) SIGNALING GATEWAY

PRIORITY CLAIM

This application claims the benefit of U.S. Provisional Patent Application Ser. No. 61/345,062, filed May 14, 2010, the disclosure of which is incorporated herein by reference in its entirety.

TECHNICAL FIELD

The subject matter described herein relates to re-homing of TDM-based signaling channels. More particularly, the subject matter described herein relates to automatic, peer node transparent re-homing of time division multiplexed TDM-based signaling channels in an XUA platform.

BACKGROUND

In some telecommunications network architectures, TDM-based signaling channels are used to carry signaling information between network nodes. For example, in one network architecture, ISDN primary rate interface (PRI) data (D) channels are used to carry Q.931 signaling between a TDM-based end device, such as a private branch exchange (PBX), and a media gateway controller (MGC) through a signaling gateway (SG). The receiving media gateway may switch the PRI bearer channels to another media gateway or other type of network switch and the signaling gateway may communicate the Q.931 signaling received on the D channels to a media gateway controller. In some instances, the signaling information may be communicated from the signaling gateway to the media gateway controller using Internet protocol (IP). In order to carry Q.931 and other types of signaling over IP, an IETF SIGTRAN adaptation layer, such as GR-303-UA, V5UA, or IUA may be used. As used herein, the term XUA will be used to refer to any of the IETF SIGTRAN or other protocols that provide an adaptation layer to carry TDM-based signaling channels over IP.

In a network architecture such as that described in the preceding paragraph where data received on TDM-based signaling channels is sent to the media gateway controller using Internet protocol, it is desirable to provide redundancy to reduce the impact of failure of the components that perform the Internet protocol conversion or encapsulation. Redundancy can be achieved at the network level by having the communicating endpoints detect the failures and reroute traffic over an alternate link or path. Such an architecture requires both redundant signaling channels and intelligence at the network endpoints to detect failures and route traffic around the failures. Although redundant TDM-based signaling channels, such as redundant D channels, are possible, they are not always implemented by network operators. Also, while protocols such as IUA, provide examples of failovers on the application server process (ASP) or MGC side, IUA does not address failover on the signaling gateway (SG) side. That is, the IUA protocol specification (IETF RFC 4233) does not specify actions to take when an SG fails. Accordingly, in light of these difficulties there exists a need for automatic, peer node transparent re-homing of TDM-based signaling channels in an XUA signaling gateway.

SUMMARY

The subject matter described herein includes methods, systems and computer readable media for automatic, peer node transparent re-homing of time division multiplexed (TDM)-based signaling channels in an X user adaptation (XUA) signaling gateway. One exemplary method includes providing an XUA SG having a plurality of SG cards, a plurality of TDM network interface cards (NICs) and a plurality of packet NICs, and a TDM switching matrix connecting the TDM NICs and the XUA SG cards. The method further includes configuring the TDM switching matrix so that a first XUA SG card terminates a set of TDM-based signaling channels. The method further includes switching the set of TDM-based signaling channels from one of the TDM NICS to the first XUA SG card. The method further includes switching the set of TDM-based signaling channels, detecting failure of the first XUA SG card, and automatically reconfiguring the TDM switching matrix so that the set of TDM-based signaling channels is sent to a second XUA SG card of the plurality of XUA SG cards.

According to another aspect of the subject matter described herein, a system for automatic, peer-node-transparent re-homing of time division multiplexed (TDM)-based signaling channels in an X user adaptation XUA signaling gateway (SG) is provided. The system includes an XUA signaling gateway, including a plurality of XUA SG cards, a plurality of TDM NICs, a plurality of packet NICs, and a switching matrix connecting the TDM NICs and the XUA SG cards. The switching matrix is configured so that a first XUA SG card of the plurality of XUA SG cards terminates a set of TDM-based signaling channels. The XUA SG further includes a controller that detects failure of the first XUA SG card while the first set of TDM channels is being switched to the first XUA SG card and automatically reconfigures the TDM switching matrix so that the set of TDM-based signaling channels is switched to a second XUA SG card of the plurality of XUA SG cards.

As used herein, the terms "node" and "platform" refer to physical computing platforms with one or more processors and associated memory.

The subject matter described herein for automatic peer node transparent re-homing of TDM-based signaling channels in an XUA signaling gateway can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
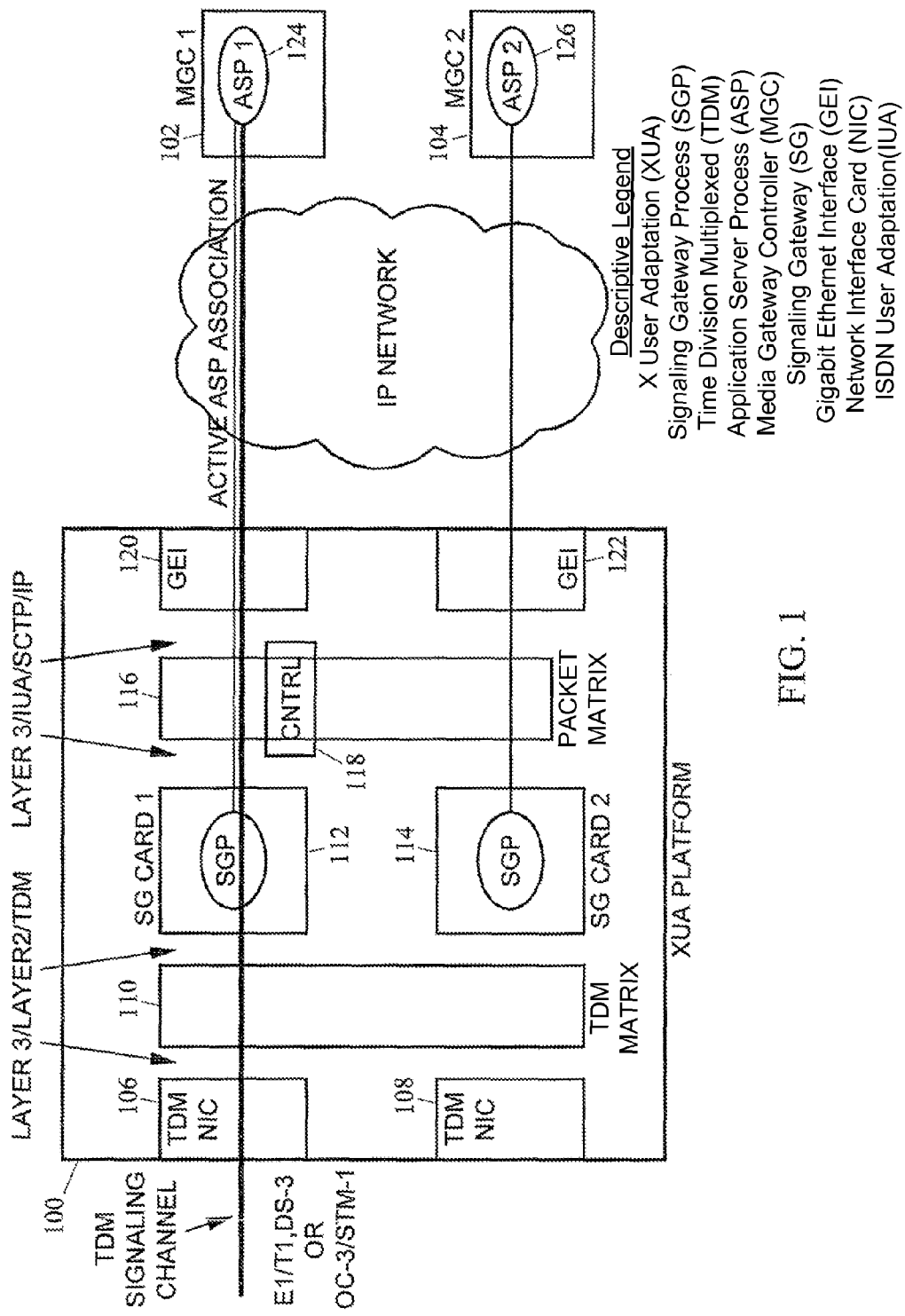
FIG. 1 is a network diagram illustrating a system for automatic re-homing of TDM-based signaling channels at an XUA platform according to an embodiment of the subject matter described herein.

FIG. 1 is a network diagram illustrating a system for automatic re-homing of signaling channels in an XUA platform according to an embodiment of the subject matter described herein. Referring to FIG. 1, XUA platform 100 may be a media gateway or other component that includes an embedded signaling gateway and that receives TDM-based signaling channels from another node. In the illustrated example, XUA platform 100 may receive TDM signaling channels, such as PRI, GR-303, or V5.2 signaling channels from a TDM-based end device, such as a PBX. XUA platform 100 may switch the bearer channels received from the TDM-based end device to another media gateway or network switch and may send signaling data received over the TDM-based signaling channels to one or more media gateway controllers 102 and 104.

In the illustrated example, XUA platform 100 includes TDM network interface cards 106 and 108, a TDM switching matrix 110, signaling gateway cards 112 and 114, packet matrix 116, which in this example includes a controller 118, and gigabit Ethernet interfaces (GEIs) 120 and 122. TDM NICs 106 and 108 receive TDM-based signaling channels and forward the data received over the signaling channels to SG cards 112 and 114 for transmission to media gateway controllers 102 and 104. SG cards 112 and 114 encapsulate the layer 3 and higher signaling data in an XUA protocol and send the XUA messages to media gateway controllers 102 and 104 via SCTP over IP. The TDM-based signaling channels received by XUA platform 100 are dynamically assigned to an SG card by controller 118. Controller 118 may assign signaling channels to SG cards in a load sharing manner. SG cards 112 and 114 form a distributed XUA SG. SG cards 112 and 114 support inter-card communication to share channel status and application server/application server process (AS/ASP) state information. ASPs 124 and 126 are instances of call processing software on media gateway controllers 102 and 104 that perform call processing based on the signaling received over the D channels terminated by XUA platform 100.

In the illustrated example, it is assumed that the TDM-based signaling channels received by TDM NIC 106 are assigned to SG card 112. Accordingly, TDM matrix 110 may be configured such that the TDM-based signaling channels are routed to SG card 112. In one exemplary implementation, controller 118 may assign the TDM channels to high-level data link control (HDLC) channels on SG card 112 or 114. Controller 118 may keep track of occupied and unoccupied HDLC channels on SG cards 112 and 114. Controller 118 may configure TDM matrix 110 such that TDM-based signaling channels assigned to a particular SG card are switched to that card.

Figure 2:
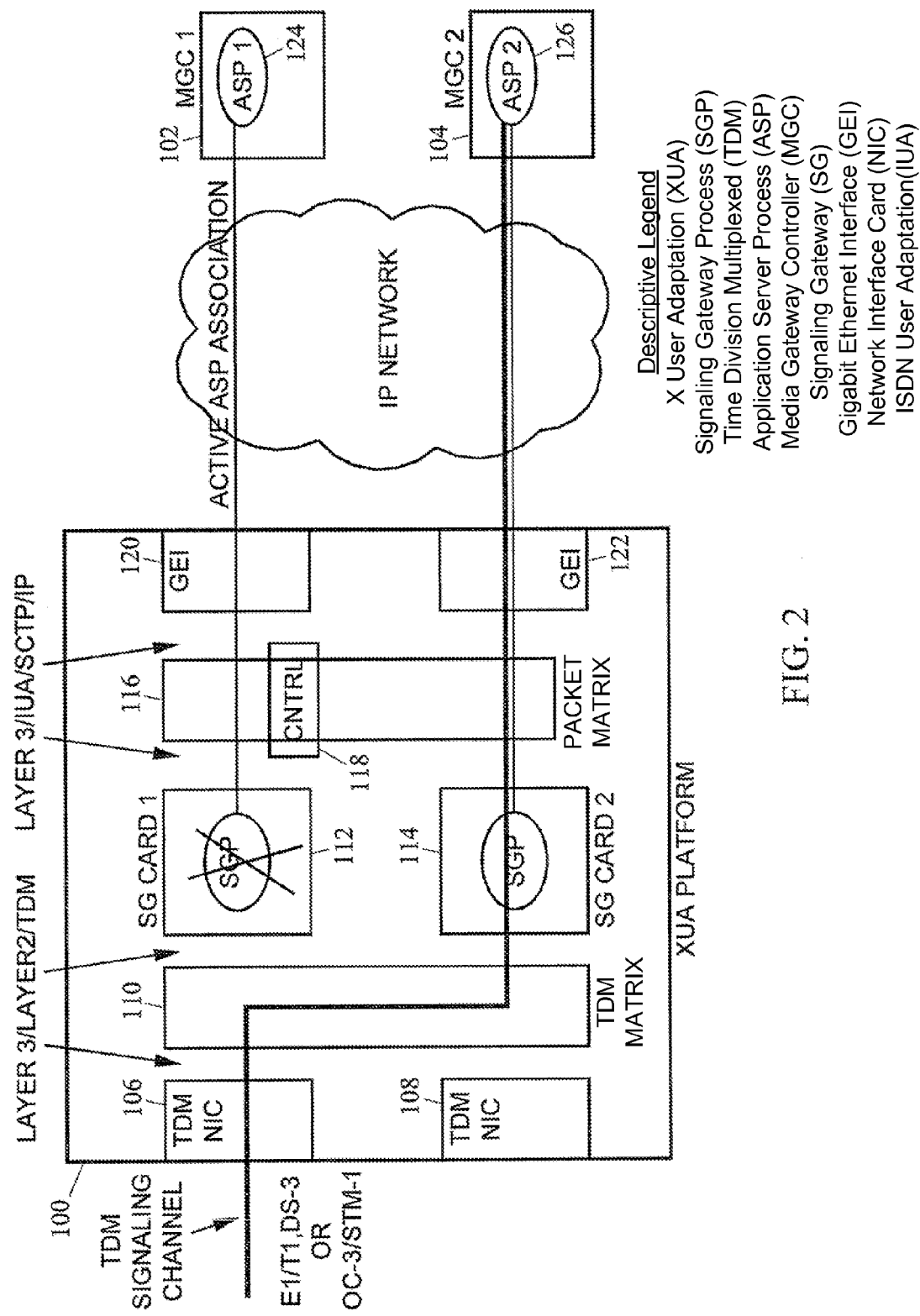
FIG. 2 is a network diagram illustrating a system for automatic re-homing of TDM-based signaling channels when an SG card fails at an XUA platform according to an embodiment of the subject matter described herein.

FIG. 2 is a block diagram illustrating XUA platform 100 where SG card 112 has failed. In FIG. 2, SG card 112, which terminates the TDM signaling channels received from TDM NIC 106, fails. In such an example, controller 118 may detect the failure through any suitable means, such as heartbeat messages to SG card 112 for which a response is not received within a time period, and move the TDM signaling channels from failed card 112 to another SG card that has spare HDLC channels to support the re-homed TDM signaling channels.

As set forth above, controller 118 preferably keeps track of HDLC channels assigned to each SG card and HDLC channels that are available on each SG card. In FIG. 2, controller 118 determines that SG card 114 has sufficient available HDLC channels to handle the TDM channels that were formerly assigned to failed card 112. Accordingly, controller 118 selects SG card 114 to handle the TDM channels from the failed SG card 112 and reconfigures TDM matrix 110 to route the TDM channels to SG card 114. Reconfiguring TDM matrix 110 to reroute the TDM channels may include updating mappings maintained by TDM matrix 110 between TDM channels and HDLC channels hosted by the signaling gateway card 114. Controller 118 may also inform signaling gateway card 114 of the assignment of the TDM channels to its available HDLC channels. Because XUA platform 100 detects its own SG failure and reconfigures itself internally to route traffic around the failure, the re-homing of the TDM channels to the new SG card occurs transparently to the end nodes with which XUA platform 100 is connected via PRI or other TDM-based channels.

In the example illustrated in FIG. 2, it is assumed that each SG card 112 and 114 communicates with a single ASP instance, and each MGC only supports a single ASP instance. Accordingly, when the TDM signaling channels are switched from SG card 112 to card 114, an MGC switchover is also required so that the TDM signaling is communicated to ASP 126 hosted by MGC 104. In such an implementation, ASP 126 can obtain state information from ASP 124 prior to or after SG card switchover.

Figure 3:
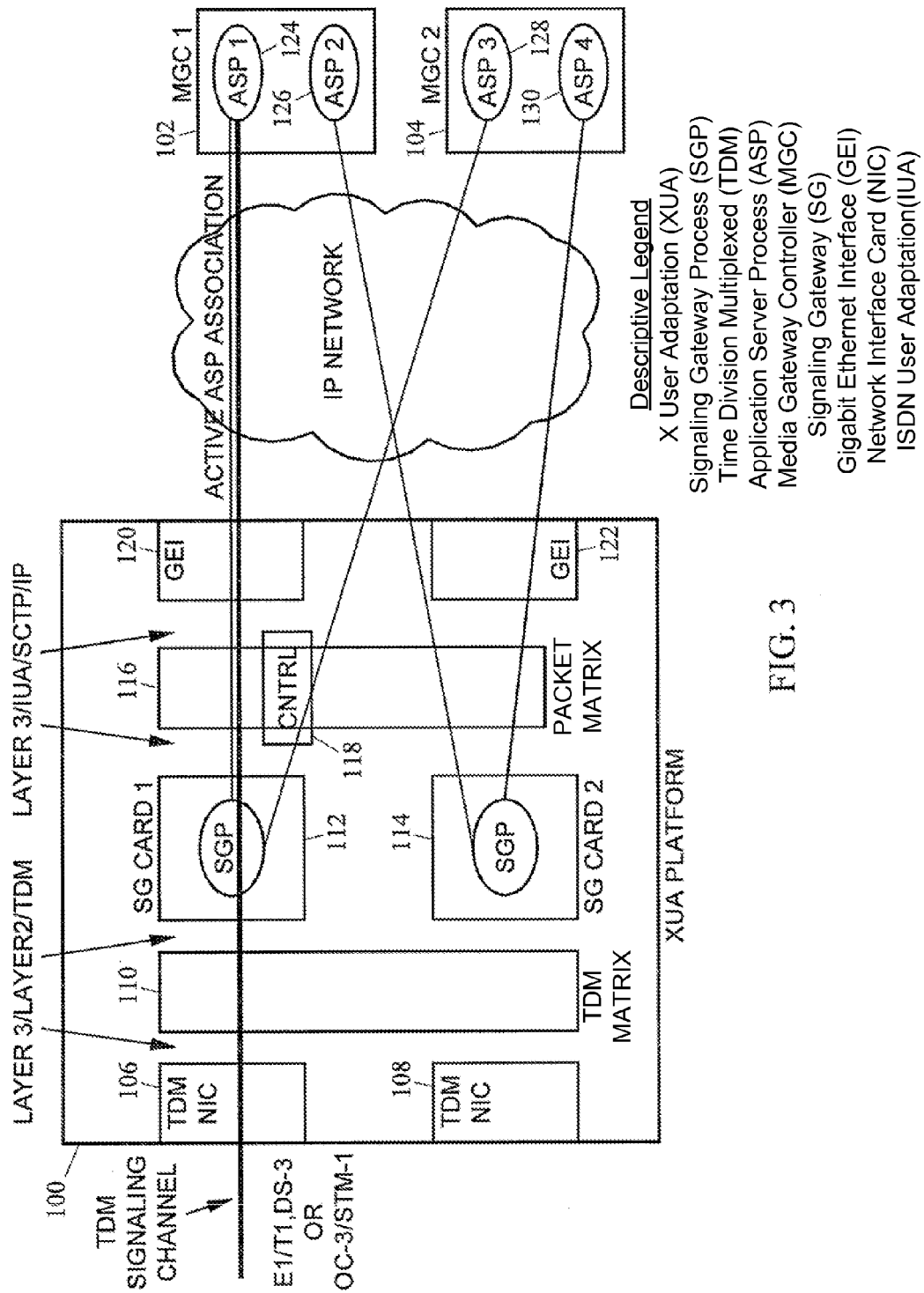
FIG. 3 is a network diagram illustrating the system for automatic re-homing of TDM-based signaling channels at an XUA platform according to an alternate embodiment of the subject matter described herein.
Figure 4:
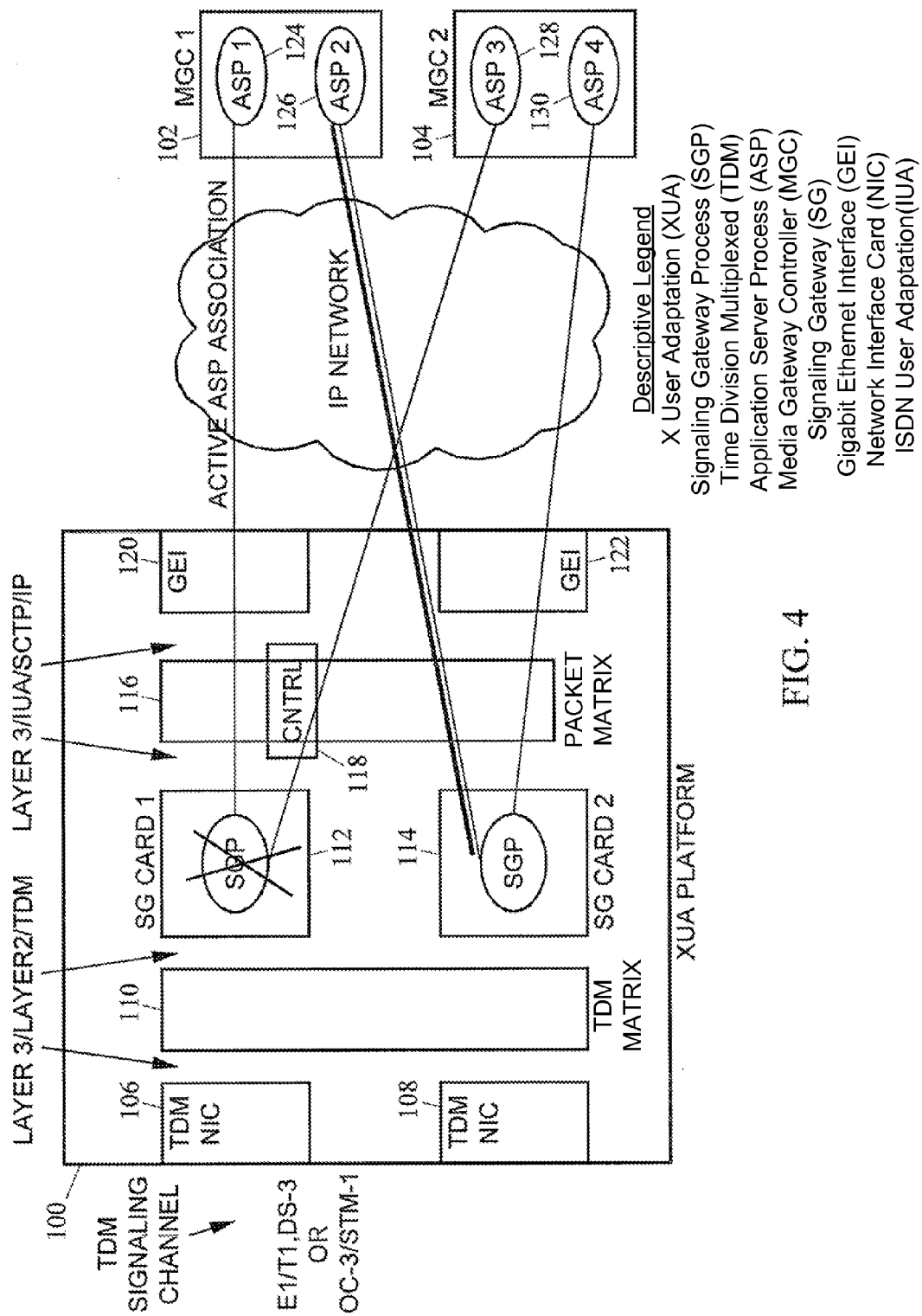
FIG. 4 is a network diagram illustrating the system for automatic re-homing of TDM-based signaling channels when an SG card fails at an XUA platform according to an alternate embodiment of the subject matter described herein.

In an alternate implementation, each SG card and each MGC may support plural active ASP instances, as illustrated in FIGS. 3 and 4, with FIG. 3 illustrating the pre-failure case and FIG. 4 illustrating the post-failure case. Referring to FIG. 3, prior to SG card 112 failing, the call setup signals received over the TDM channels terminated by SG card 112 are forwarded to and processed by ASP 124 hosted by MGC 102. SG card 112 communicates with ASP instances 124 and 128, which are hosted by different MGCs 102 and 104. Similarly, SG card 114 communicates with ASP instances 126 and 130, which also are hosted by separate MGCs 102 and 104. ASP instances 124, 126, 128, and 130 may operate in an active-standby manner for each other. As illustrated in FIG. 4, when SG card 112 fails, controller 118 switches the TDM channels to SG card 114, which communicates with ASP instance 126, which is also hosted by MGC 102. Accordingly, after failure of SG card 112, the SG card 114 communicates the call setup signaling received over the TDM channels to ASP instance 126, and MGC switchover is not required.

It is also possible to avoid ASP switchover when an SG card fails. For example, when an SG card fails, the ASP that formerly communicated with the failed SG card may establish an SCTP association with the new SG card, run the ASP up procedure, and then the ASP active procedure. Such procedures take time, which means that communication links are down until the ASP is in the active state again. The time required to run these procedures is why the standards specify load sharing methods and override redundancy schemes for ASPs. There can be more than one active ASP in an AS, in which case traffic is load-shared among the ASPs. If one fails, the traffic to the failed ASP is distributed between the remaining active ASPs. If the override mode of redundancy is used, only one ASP is active, but there can be any number of ASPs that have SCTP associations that are up but in the inactive state. If the one active ASP fails, one of the other inactive ASPs takes over, which is much faster than having to establish the SCTP association, bring the ASP to the up state and then bring it to the active state. Accordingly, in the examples described above, the new SG card may interact with the same ASP that the failed card communicated with or with another ASP that is located on the same or a different MGC.

Figure 5:
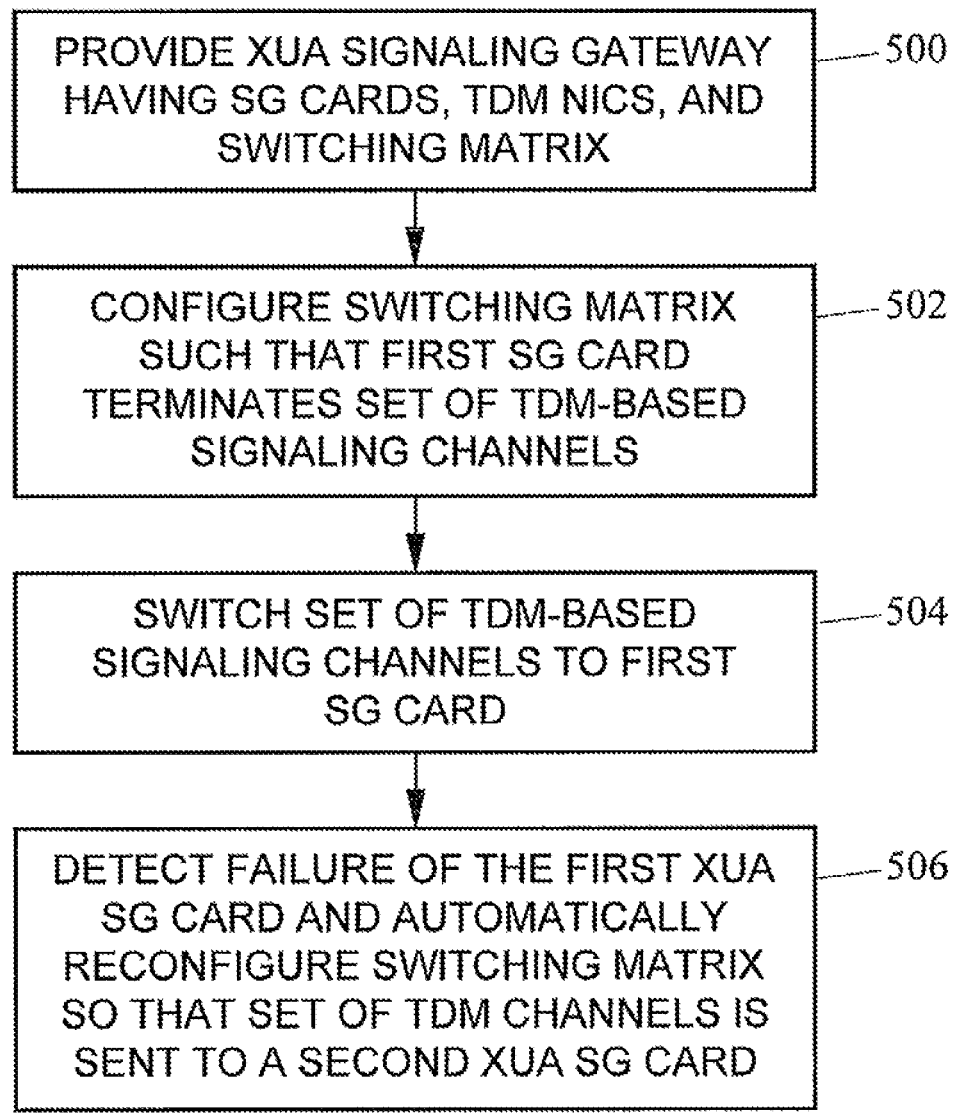
FIG. 5 is a flow chart illustrating exemplary steps for automatic re-homing of TDM-based signaling channels at an XUA platform according to an embodiment of the subject matter described herein.

FIG. 5 is a flow chart illustrating exemplary steps for automatically re-homing TDM switching channels in an XUA signaling platform according to an embodiment of the subject matter described herein. Referring to FIG. 5, in step 500, an XUA signaling platform having a plurality of SG cards, a plurality of TDM network interface cards, a plurality of packet network interface cards, and a TDM switching matrix connecting the TDM NICs and the XUA SG cards is provided. For example, XUA platform 100 illustrated in FIG. 1 may be provided to operate in a network to communicate call setup signaling received over TDM channels to media gateway controllers via XUA. In step 502, the switching matrix is configured so that a first XUA SG card terminates a set of TDM-based signaling channels. For example, in FIG. 1, switching matrix 110 may be configured on-the-fly and using a load sharing algorithm by controller 118 so that SG card 112 terminates a set of TDM signaling channels. In step 504, the set of TDM channels is switched from one of the NICs to the first XUA SG card. For example, in FIG. 1, the TDM signaling channels received by TDM NIC 106 may be switched to SG card 112. In step 506, while switching the set of TDM channels, a failure of the first XUA SG card is detected, and the TDM switching matrix is automatically reconfigured so that the set of TDM-based signaling channels is sent to a second XUA SG card of the plurality of XUA SG cards. For example, as illustrated in FIG. 2, when SG card 112 fails, controller 118 reconfigures switching matrix 110 so that the TDM channels formerly terminated by SG card 112 are terminated by SG card 114. The switching of SG cards occurs transparently to peer TDM devices and does not require that the peer TDM device to detect the failed SG card. As a result, XUA platform 100 creates redundancy in its XUA conversion feature without requiring a change in network protocols to detect and react to failures.

Figure 6:
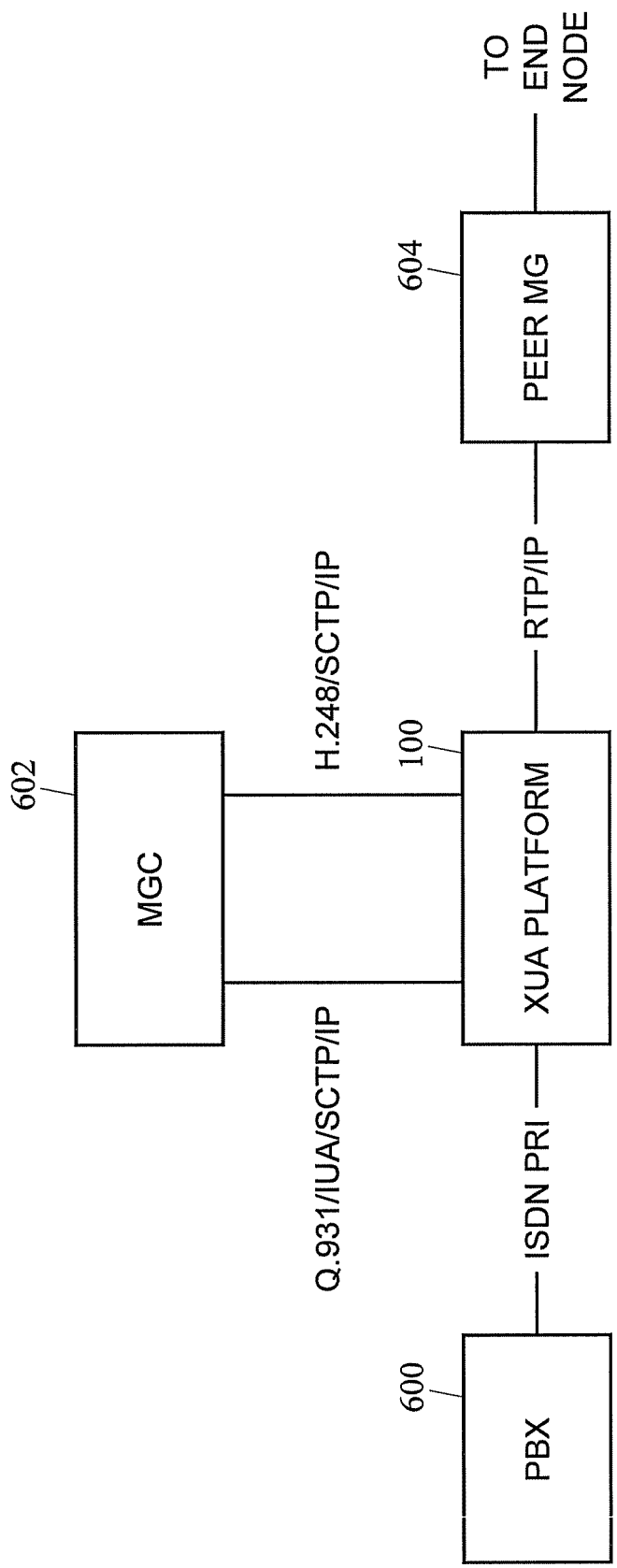
FIG. 6 is a network diagram illustrating an exemplary deployment of an XUA signaling platform according to an embodiment of the subject matter described herein.

FIG. 6 illustrates an exemplary network deployment of XUA platform 100 according to an embodiment of the subject matter described herein. Referring to FIG. 6, XUA platform 100 is connected via ISDN PRI TDM signaling links to PBX 600. XUA platform 100 is connected to MGC 602 via SCTP/IP associations over which H.248 (media gateway control) signaling and Q.931/XUA (ISDN call control over XUA) signaling is communicated. XUA platform 100 may switch media RTP/IP (media signals) received from PBX 600 to peer media gateway 604, which may convert the signals back to TDM and forward the signals to an end node (not shown). Peer media gateway 604 may also be controlled by a media gateway controller, which is not shown in FIG. 6 for simplicity. XUA platform 100 may perform automatic rehoming of TDM signaling channels when an XUA SG card fails without requiring failure detection by PBX 600 or notification to PBX 600.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatic, peer node transparent re-homing of time division multiplexed (TDM)-based signaling channels in an X user adaptation (XUA) signaling gateway (SG), the method comprising: providing an XUA SG having a plurality of signaling gateway (SG) cards, a plurality of TDM network interface cards (NICs) and a plurality of packet NICs, and a switching matrix connecting the TDM NICs and the XUA SG cards; configuring the switching matrix to terminate a set of TDM-based signaling channels at a first XUA SG card; switching the set of TDM-based signaling channels from one of the TDM NICS to the first XUA SG card; and while switching the set of TDM-based signaling channels: detecting failure of the first XUA SG card; and automatically reconfiguring the switching matrix to couple the set of TDM-based signaling channels to a second XUA SG card of the plurality of XUA SG cards.

2. The method of claim 1 comprising, at the second XUA SG card, extracting application layer information from the TDM-based signaling channels and forwarding the application layer information in XUA protocol data units to the packet NICs and to a media gateway controller (MGC) over a packet network.

3. The method of claim 2 wherein the XUA layer protocol data units include one of IUA, GR-303-UA, and V5UA protocol data units.

4. The method of claim 1 wherein the TDM-based signaling channels include one of GR-303, PRI, and V.5 signaling channels.

5. The method of claim 1 wherein the XUA SG comprises a stand-alone XUA signaling gateway.

6. The method of claim 1 wherein the XUA SG is co-located with a media gateway.

7. The method of claim 1 wherein the switching matrix comprises a TDM switching matrix and wherein the XUA SG further includes a packet switching matrix for switching packets from the SG cards to the packet NICs.

8. The method of claim 1 wherein automatically reconfiguring the switching matrix to switch the set of TDM-based signaling channels hosted on the first SG card to a second SG card includes performing the switching without notifying peer nodes of the switching.

9. The method of claim 1 wherein the first XUA SG card is configured to communicate with a first application server process (ASP) instance hosted by a first media gateway controller (MGC), wherein the second XUA SG card is configured to communicate with a second ASP instance hosted by a second MGC and wherein, after failure of the first XUA SG card, call setup signaling received over the TDM-based signaling channels terminated by the second SG card are sent to the second ASP instance hosted by the second MGC.

10. The method of claim 1 wherein the first XUA SG card is configured to communicate with a first application server process (ASP) instance hosted by a first media gateway controller (MGC), wherein the second XUA SG card is configured to communicate with a second ASP instance hosted by the first MGC and wherein, after failure of the first XUA SG card, call setup signaling received over the TDM-based signaling channels terminated by the second SG card are sent to the second ASP instance hosted by the first MGC.

11. The method of claim 1 wherein the first XUA SG card is configured to communicate with the first application server process (ASP) instance hosted by a first media gateway controller (MGC) and wherein the second XUA SG card is configured to communicate with the first ASP instance after failure of the first XUA SG card.

12. The method of claim 1 wherein the steps are performed transparently to a TDM-based end node that originates the TDM-based signaling channels.

13. A system for automatic, peer-node-transparent re-homing of time division multiplexed (TDM)-based signaling channels in an X user adaptation XUA signaling gateway (SG), the system comprising: an XUA signaling gateway including: a plurality of XUA SG cards; a plurality of TDM NICs; a plurality of packet NICs; a switching matrix connecting the TDM NICs and the XUA SG cards, wherein the switching matrix is configured to terminate a set of TDM-based signaling channels at a first XUA SG card of the plurality of XUA SG cards; and a controller for, while the switching matrix is switching the set of TDM-based signaling channels to the first XUA SG card: detecting failure of the first XUA SG card; and automatically reconfiguring the switching matrix to couple the set of TDM-based signaling channels is switched to a second XUA SG card of a plurality of XUA SG cards.

14. The system of claim 13 comprising, at the second XUA SG card, extracting application layer information from the TDM-based signaling channels and forwarding the application layer information in XUA protocol data units to the packet NICs and to a media gateway controller over a packet network.

15. The system of claim 14 wherein the XUA protocol data units include one of IUA, GR-303-UA, and V5UA protocol data units.

16. The system of claim 13 wherein the TDM-based signaling channels include one of GR-303, PRI, and V.5 signaling channels.

17. The system of claim 13 wherein the XUA SG comprises a stand-alone entity.

18. The system of claim 13 wherein the XUA SG is co-located with a media gateway.

19. The system of claim 13 wherein the switching matrix comprises a TDM switching matrix and wherein the XUA SG further includes a packet switching matrix for switching packets from the XUA SG cards to the packet NICs.

20. The system of claim 13 wherein automatically reconfiguring the switching matrix to switch the set of TDM-based signaling channels hosted on first SG card to a second XUA SG card includes performing the switching without notifying peer nodes of the switching.

21. The system of claim 13 wherein the first XUA SG card is configured to communicate with a first application server process (ASP) instance hosted by a first media gateway controller (MGC), wherein the second XUA SG card is configured to communicate with a second ASP instance hosted by a second MGC and wherein, after failure of the first XUA SG card, call setup signaling received over the TDM-based signaling channels terminated by the second SG card are sent to the second ASP instance hosted by the second MGC.

22. The system claim 13 wherein the first XUA SG card is configured to communicate with a first application server process (ASP) instance hosted by a first media gateway controller (MGC), wherein the second XUA SG card is configured to communicate with a second ASP instance hosted by the first MGC and wherein, after failure of the first XUA SG card, call setup signaling received over the TDM-based signaling channels terminated by the second SG card are sent to the second ASP instance hosted by the first MGC.

23. The system of claim 13 wherein the first XUA SG card is configured to communicate with the first application server process (ASP) instance hosted by a first media gateway controller (MGC) and wherein the second XUA SG card is configured to communicate with the first ASP instance after failure of the first XUA SG card.

24. The system of claim 13 wherein the controller is configured to switch the TDM-based signaling channels to the second XUA SG card transparently to a TDM-based end node that originates the TDM-based signaling channels.

25. A non-transitory computer readable medium having stored thereon executable instructions that when executed by the processor of a computer control the computer to perform steps comprising: configuring a switching matrix in an X user adaptation layer (XUA) signaling gateway (SG) having a plurality of signaling gateway (SG) cards and a plurality of TDM network interface cards (NICs) to couple a first XUA signaling gateway card terminates a set of TDM-based signaling channels; switching the set of TDM-based signaling channels from one of the TDM NICs to the first XUA SG card; and while switching the first of TDM-based signaling channels: detecting failure of the first XUA SG card; automatically reconfiguring the switching matrix to couple the set of TDM-based signaling channels is switched to a second XUA SG card of the plurality of XUA SG cards.

* * * * *

UNITED STATES PATENT AND TRADEMARK OFFICE
CERTIFICATE OF CORRECTION

PATENT NO. : 8,804,484 B2  
APPLICATION NO. : 13/026967  
DATED : August 12, 2014  
INVENTOR(S) : Richard James Bianconi et al.

Page 1 of 1

It is certified that error appears in the above-identified patent and that said Letters Patent is hereby corrected as shown below:

On the title page, item (12): Delete "Blanconi" and insert -- Bianconi --.

On the title page, item (75) Inventors: Delete "Blanconi" and insert -- Bianconi --.

Signed and Sealed this
Second Day of August, 2016

Michelle K. Lee
*Director of the United States Patent and Trademark Office*